US009903451B2

(12) United States Patent
Johnson et al.

(10) Patent No.: US 9,903,451 B2
(45) Date of Patent: Feb. 27, 2018

(54) LINKAGE TO ACTUATE INLET GUIDE VANES

(71) Applicant: TRANE INTERNATIONAL INC., Piscataway, NJ (US)

(72) Inventors: Jon Christopher Johnson, New Albin, IA (US); Richard Mason Heiden, Holmen, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 284 days.

(21) Appl. No.: 14/929,658

(22) Filed: Nov. 2, 2015

(65) Prior Publication Data

US 2016/0123347 A1 May 5, 2016

Related U.S. Application Data

(60) Provisional application No. 62/073,500, filed on Oct. 31, 2014.

(51) Int. Cl.
| *F04D 17/10* | (2006.01) |
| *F04D 29/46* | (2006.01) |
| *F16H 25/20* | (2006.01) |
| *F04D 27/00* | (2006.01) |
| *F04D 15/00* | (2006.01) |

(Continued)

(52) U.S. Cl.
CPC ......... *F16H 25/20* (2013.01); *F04D 15/0022* (2013.01); *F04D 27/002* (2013.01); *F04D 29/462* (2013.01); *F04D 29/464* (2013.01); *F16H 31/005* (2013.01); *F04D 17/10* (2013.01); *F04D 29/4213* (2013.01); *F05D 2250/51* (2013.01); *F16H 2025/2043* (2013.01)

(58) Field of Classification Search
CPC .... F04D 15/0022; F04D 17/10; F04D 27/002; F04D 29/4213; F04D 29/462; F04D 29/464; F16H 2025/2028; F16H 2025/2043; F16H 25/20; F16H 31/005; F05D 2250/51

See application file for complete search history.

(56) References Cited

U.S. PATENT DOCUMENTS 4,770,603 A * 9/1988 Engels .................... F01D 5/141
  415/147
4,890,977 A * 1/1990 Tremaine .............. F04D 29/462
  415/150

(Continued)

*Primary Examiner* — Igor Kershteyn
(74) *Attorney, Agent, or Firm* — Hamre, Schumann, Mueller & Larson, P.C.

(57) ABSTRACT

An actuation linkage assembly may include a first lever arm connected to one end of a shaft, a second lever arm connected at one end to another end of the shaft, a transition linkage connected to the other end of the second lever arm, and a bracket connected to the transition linkage. The transition linkage is configured to connect the bracket on a driver ring and to the shaft to transfer rotational motion about the axis of the shaft, from a linear motion received by an actuator, to a linear motion through the bracket causing rotational motion of the driver ring. The actuation linkage assembly is configured with high mechanical advantage. The actuation linkage assembly can be part of a movable inter-stage vane guide assembly in a compressor such as for example a centrifugal compressor, which may be part of a chiller such as in a HVAC system.

18 Claims, 17 Drawing Sheets

(51) Int. Cl.
*F16H 31/00* (2006.01)
*F04D 29/42* (2006.01)

(56) References Cited

U.S. PATENT DOCUMENTS

| | | | | |
|---|---|---|---|---|
| 5,518,365 A * | 5/1996 | Baets | ............... | F01D 17/165 415/160 |
| 6,669,442 B2 * | 12/2003 | Jinnai | ............... | F01D 17/165 29/889.2 |
| 7,273,346 B2 * | 9/2007 | Bouru | ............... | F04D 29/563 415/162 |
| 7,322,790 B2 * | 1/2008 | Bouru | ............... | F04D 29/563 415/162 |
| 7,802,964 B2 * | 9/2010 | Bouru | ............... | F04D 29/563 415/149.4 |
| 2010/0278639 A1 * | 11/2010 | Hood | ............... | F04D 29/563 415/162 |
| 2012/0121403 A1 * | 5/2012 | Clemons | ............ | F04D 27/0246 415/208.1 |
| 2012/0263586 A1 * | 10/2012 | Patil | ............... | F04D 27/0246 415/208.1 |

\* cited by examiner

SECTION A-A

DETAIL E

SECTION D-D

SECTION C-C

LINKAGE TO ACTUATE INLET GUIDE VANES

FIELD

Embodiments disclosed herein generally relate to a linkage assembly to actuate guide vanes, such as inlet guide vanes that may be used in a compressor, for example a centrifugal compressor, which may be employed in a chiller unit of a heating, ventilation, and air conditioning (HVAC) system or a refrigeration system. In particular, apparatuses, systems and methods are directed to a linkage assembly to actuate inlet guide vanes in a centrifugal compressor of a chiller unit in an HVAC system.

BACKGROUND

Actuation of inlet guide vanes in centrifugal compressors, which may be employed for example in a chiller unit of an HVAC system, may be performed via mechanical actuating components.

SUMMARY

The use of relatively denser refrigerants can lead to higher loading on mechanical components of a refrigeration unit, such as for example mechanical components of a compressor in a chiller unit which may be used in an HVAC or refrigeration system. One example of such mechanical components of a compressor can include guide vanes, which may be used for example in movable inter-stage vane assemblies of a centrifugal compressor in a chiller unit. Higher guide vane loading may occur during operation of a chiller, such as may be due to the use of a relatively denser refrigerant or due to other operating circumstances that may impact the actuation of the guide vanes.

Improvements may be made to structures, assemblies, constructions, configurations and/or arrangements directed to the actuation of guide vanes, e.g. inlet guide vanes, such as for example that can withstand higher loading conditions. Previous assemblies have employed methods using fork and rod configurations as the actuation components, which may be relatively light weight by nature in their structure, and which have size limitations due to space constraints, and are thus susceptible to wear issues and to performance issues to be able to translate the forces or loads that may be encountered through the actuation components. Such fork and rod designs can flex and may have high Hertzian contact stress, which can lead to premature failure. The fork and rod designs can create greater moment on the driver ring which may cause additional side forces and associated deflection of the driver ring. Other designs have employed methods using rack and pinion gear configurations as actuation components, which are relatively expensive and complex by requiring great care during assembly to obtain proper alignment of the gears.

Embodiments illustrated and described herein are directed to a linkage assembly to actuate inlet guides which can provide advantages of a relatively strong and robust construction, arrangement, and configuration that can be sufficient to translate forces through the actuation components of the linkage assembly, while being relatively convenient and cost effective in its design. The linkage assembly herein can provide advantages of ease of adjustability and higher reliability, while maintaining hermetic integrity for example of a compressor. The embodiments herein can maximize leverage for example of the drive axis for actuation, which may for example come in from the outside of the compressor shaft. The embodiments herein can provide a relative ease of installation.

In one embodiment, a linkage assembly includes a first lever arm having a first end connected to a shaft at a first end thereof. The first lever arm has a second end configured to receive a linear actuating motion so as to rotate the first lever arm, thereby rotating the shaft. The shaft has a second end opposite the first end, where the second end of the shaft is connected to a second lever arm at a first end thereof. The first end of the second lever arm is configured to receive the rotating motion of the shaft so as to rotate the second lever arm. The second lever arm has a second end connected to a transition linkage at a first end thereof. The first end of the transition linkage is configured to receive the rotating motion of the second lever arm and has a second end configured to transmit a linear motion therethrough. The second end of the transition linkage is connected to a bracket configured to receive the linear motion of the second end of the transition linkage.

In some embodiments, the first lever arm is adjustable relative to the shaft and the second lever arm is fixed relative to the shaft. In some embodiments, the first lever arm and the second lever arm are oriented about the axis of the shaft such that when an amount of rotation of the first lever arm rotates the shaft, the amount of rotation of the second lever arm is equivalent or about the same as the amount of rotation of the first lever arm.

In some embodiments, the actuation linkage assembly is connected to an actuator. In some embodiments, the actuator is a linear actuator.

In some embodiments, the second lever arm is shorter than the first lever arm. In some embodiments, the second lever arm extends outward from the shaft at a distance that is shorter than a distance that the first lever arm extends outward from the shaft.

In some embodiments, the transition linkage includes a connector at the first end and a connector at the second end with a main body therebetween, where the connector at the first end receives a rotational motion to move the main body in a linear motion, and where the connector at the second end receives the linear motion.

In some embodiments, the transition linkage includes the main body being a rod, and the connectors are ties. In some embodiments, the transition linkage is a tie rod structure having a rotational tie as the connector at the first end and a linear tie as the connector at the second end.

In some embodiments, the transition linkage may be referred to as a spherical rod end bearing that is configured to go from an axial rotational movement received by a relatively small lever on the shaft to linearly drive a bracket which can rotate a driver ring which rotates another small lever (e.g. bracket) on the ring to drive the guide vanes. In some embodiments, the bracket has a concave curvature on one or more sides.

The concave curvature provides a clearance relative to one or more movable guide vane assembly components. In some embodiments, the bracket has a convex or outward curvature which facilitates the linear movement of the bracket as received by the transition linkage.

In some embodiments, the actuation linkage assembly is implemented as a part of a compressor. In some embodiments, the actuation linkage assembly is implemented as a part of a centrifugal compressor. In some embodiments, the centrifugal compressor is a part of a chiller unit. In some embodiments, the chiller unit is part of a HVAC system or refrigeration system.

In one embodiment a method for actuating guide vanes includes receiving a rotating axial motion by a transition linkage, transmitting a linear motion through the transition linkage, receiving the linear motion by a bracket, transmitting the linear motion through the bracket, rotating a driver ring connected to the bracket, and rotating one or more guide vanes to one or more open states or one or more relatively closed states.

DRAWINGS

These and other features, aspects, and advantages of the will become better understood when the following detailed description is read with reference to the accompanying drawing, wherein.

While the above-identified figures set forth particular embodiments of the actuation linkage assembly, other embodiments are also contemplated, as noted in the description herein. In all cases, this disclosure presents illustrated embodiments of the actuation linkage assembly are by way of representation but not limitation. Numerous other modifications and embodiments can be devised by those skilled in the art which fall within the scope and spirit of the principles of the actuation linkage assembly described and illustrated herein.

DETAILED DESCRIPTION

Embodiments disclosed herein relate generally to an actuation linkage assembly. In particular, apparatuses, systems and methods are directed to linkages to actuate for example a movable guide vane assembly, which may be used in a compressor, such as a centrifugal compressor in a chiller unit of an HVAC or refrigeration system.

Figure 1:
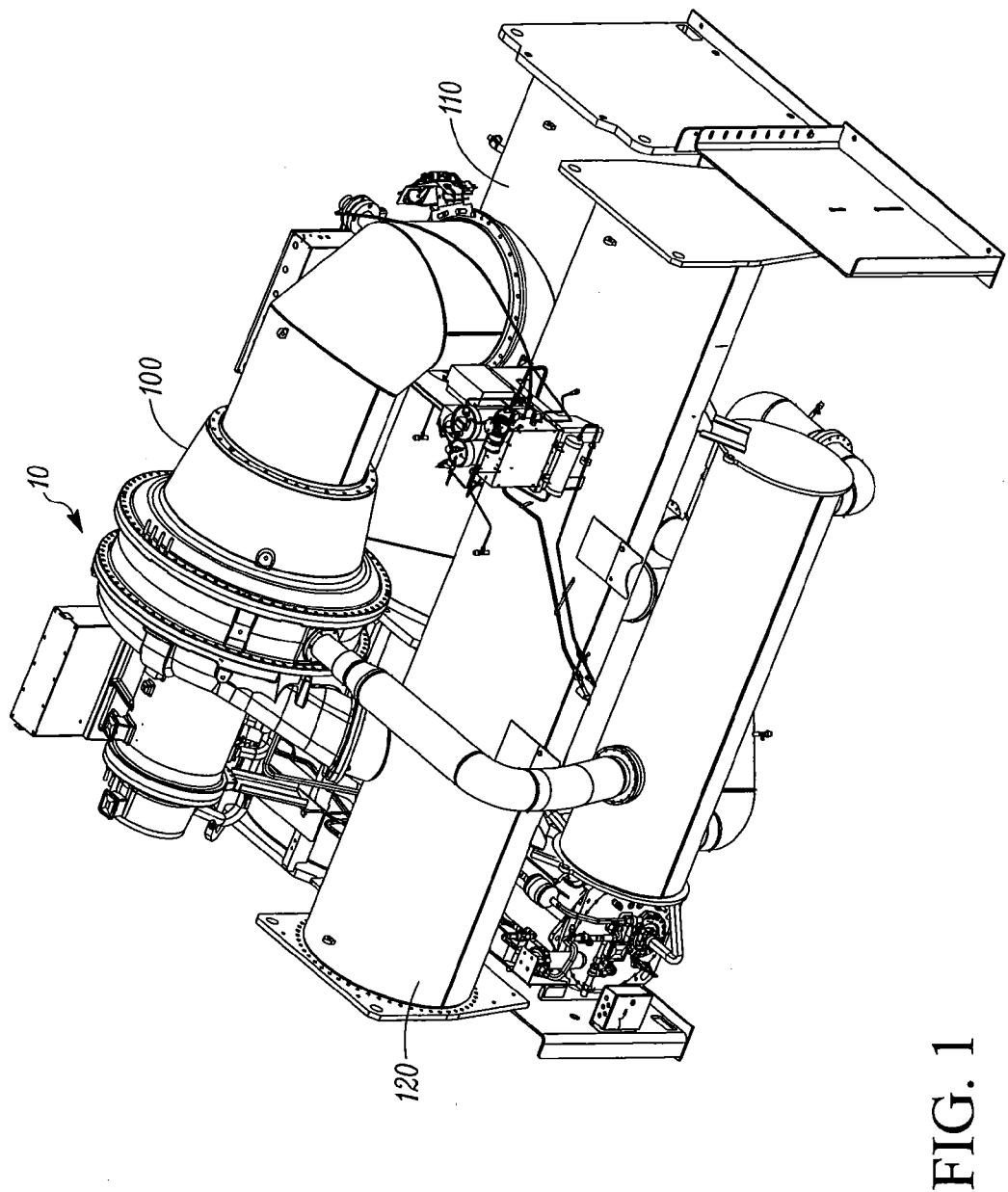
FIG. 1 is a perspective view of one embodiment of a compressor, such as for example a centrifugal compressor, which may be used in a chiller unit of an HVAC or refrigeration system.

FIG. 1 is a perspective view of one embodiment of a compressor 100, such as for example a centrifugal compressor, which may be used in a chiller unit 10 of a HVAC or refrigeration system. The chiller unit 10 includes among other features, the compressor 100 fluidly connected to a condenser 120, which is fluidly connected to an evaporator 110, and which is fluidly connected to the compressor 100 for example in a cooling circuit. For example, the fluid used in the cooling circuit can be a refrigerant which is in heat exchange relationship with one or more fluids, such as for example water to cool or chill the water for other use or applications, such as for example in comfort cooling applications. As shown in FIG. 1 for example, evaporated refrigerant may be received by way of suction from the evaporator 110 to the compressor 100, where the compressor has a movable inlet guide vane assembly used for the compression of the refrigerant which is then discharged to the condenser 120.

Figure 2:
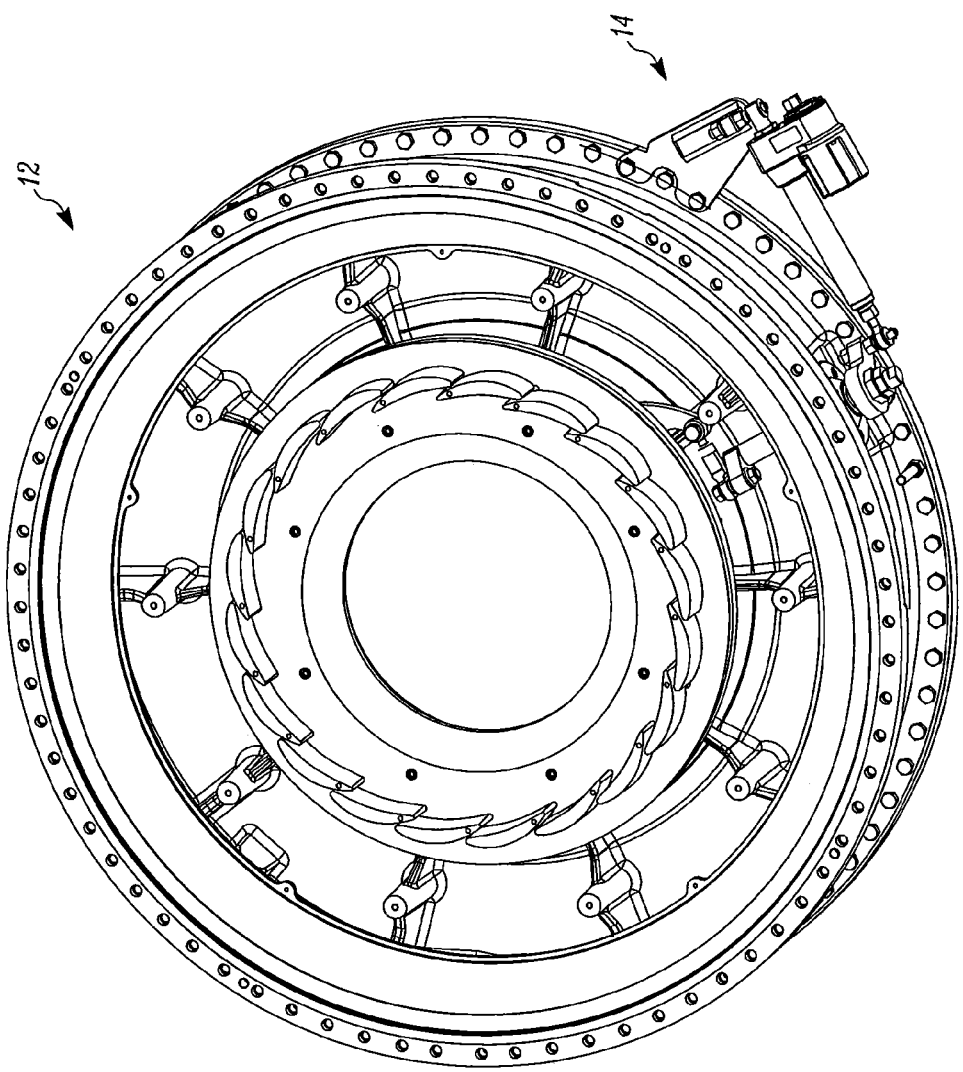
FIG. 2 is a perspective view of one embodiment of a movable inter-stage vane assembly shown from the guide vane side, which may be employed in a centrifugal compressor such as the compressor of FIG. 1, and is shown connected to one embodiment of an actuation linkage assembly.
Figure 3:
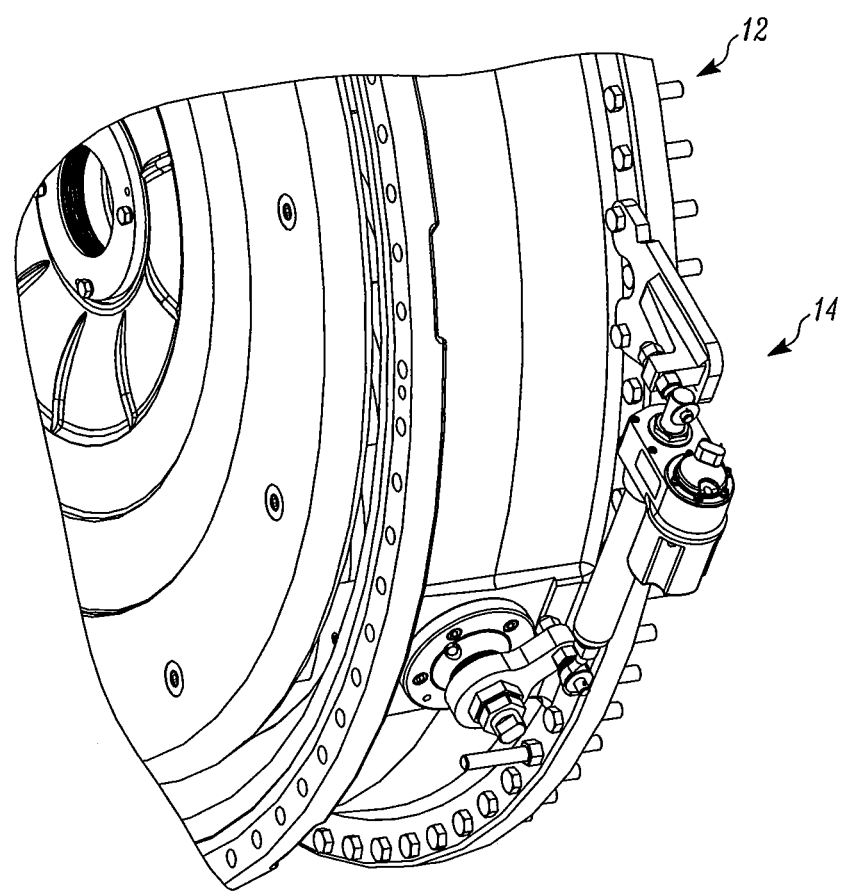
FIG. 3 is partial perspective view of the movable inter-stage vane assembly of FIG. 2 and showing a close up view of the actuation linkage assembly.
Figure 4:
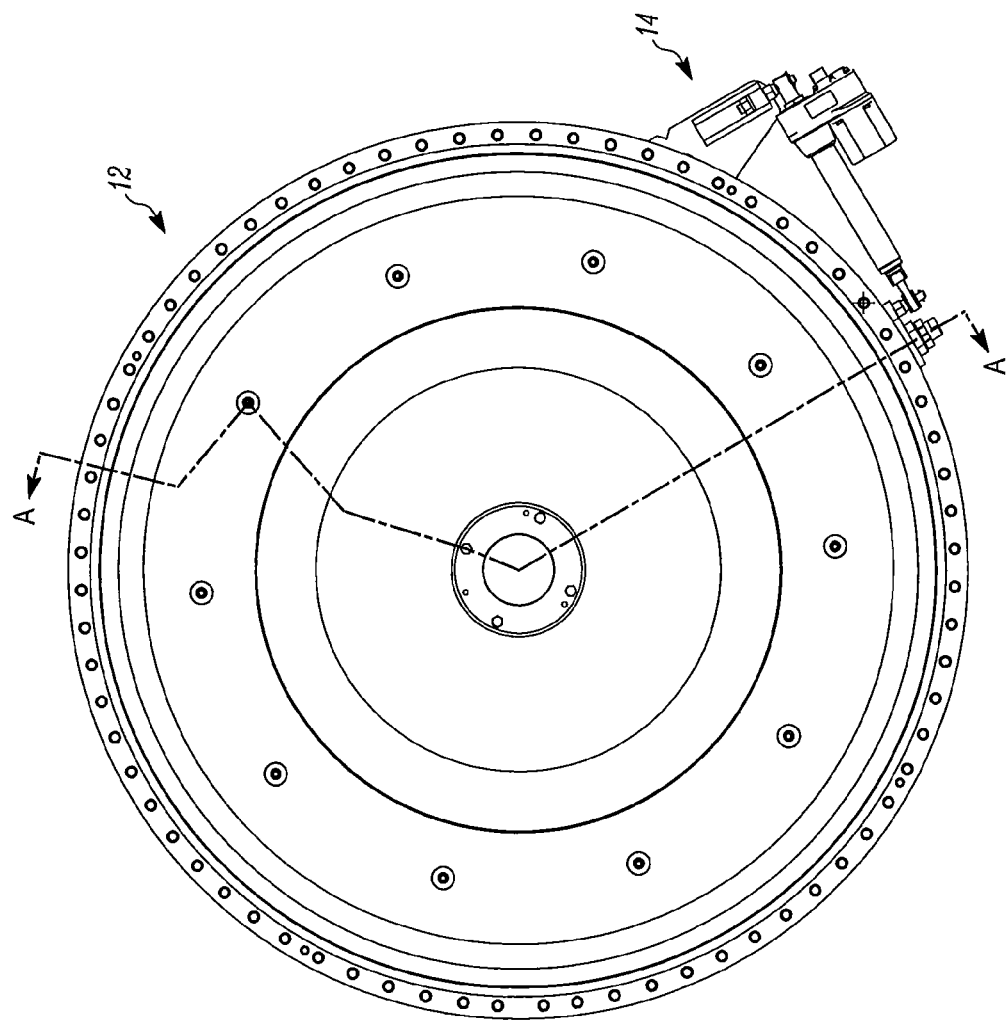
FIG. 4 is a side view of the movable inter-stage vane assembly shown from the side opposite the guide vane side.
Figure 5:
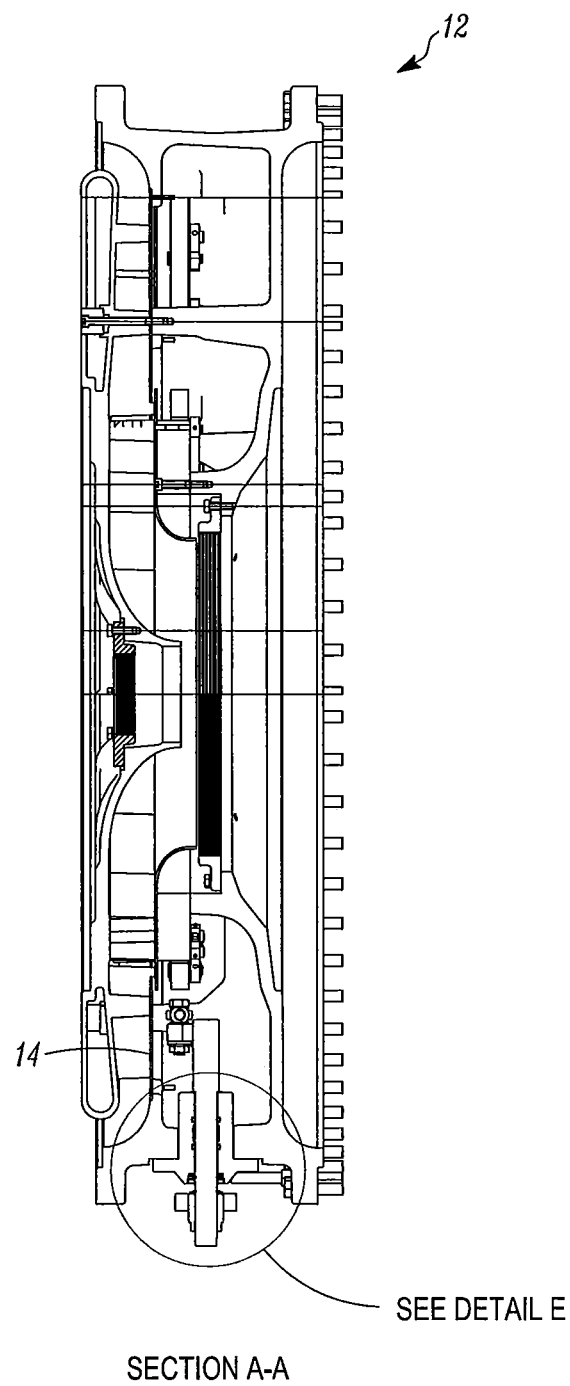
FIG. 5 is a sectional view taken from A-A of FIG. 4 of the movable inter-stage vane assembly.

FIGS. 2 to 5 refer to various views of one embodiment of a movable guide vane assembly 12, which can be for example an movable inter-stage guide vane assembly (referred to as such hereafter), which may be used in a compressor such as the centrifugal compressor 100 in the chiller unit 10 of FIG. 1. FIG. 2 is a perspective view of the movable inter-stage vane assembly 12 shown from a guide vane side, and which is shown connected to one embodiment of an actuation linkage assembly 14. FIG. 3 is partial perspective view of the movable inter-stage vane assembly of FIG. 2, showing a close up view of the actuation linkage assembly 14. FIG. 4 is a side view of the movable inter-stage vane assembly 12 shown from the side opposite the guide vane side. FIG. 5 is a sectional view taken from A-A of FIG. 4 of the movable inter-stage vane assembly 12.

Figure 6:
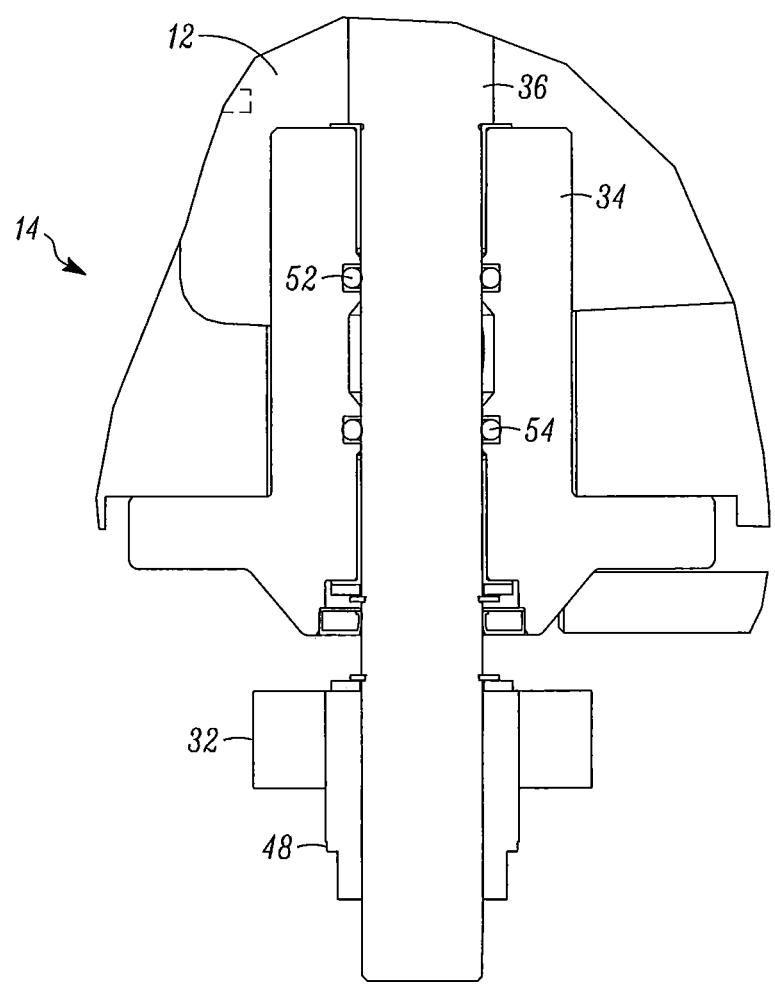
FIG. 6 is a close-up view taken from Detail E of FIG. 5.
Figure 7:
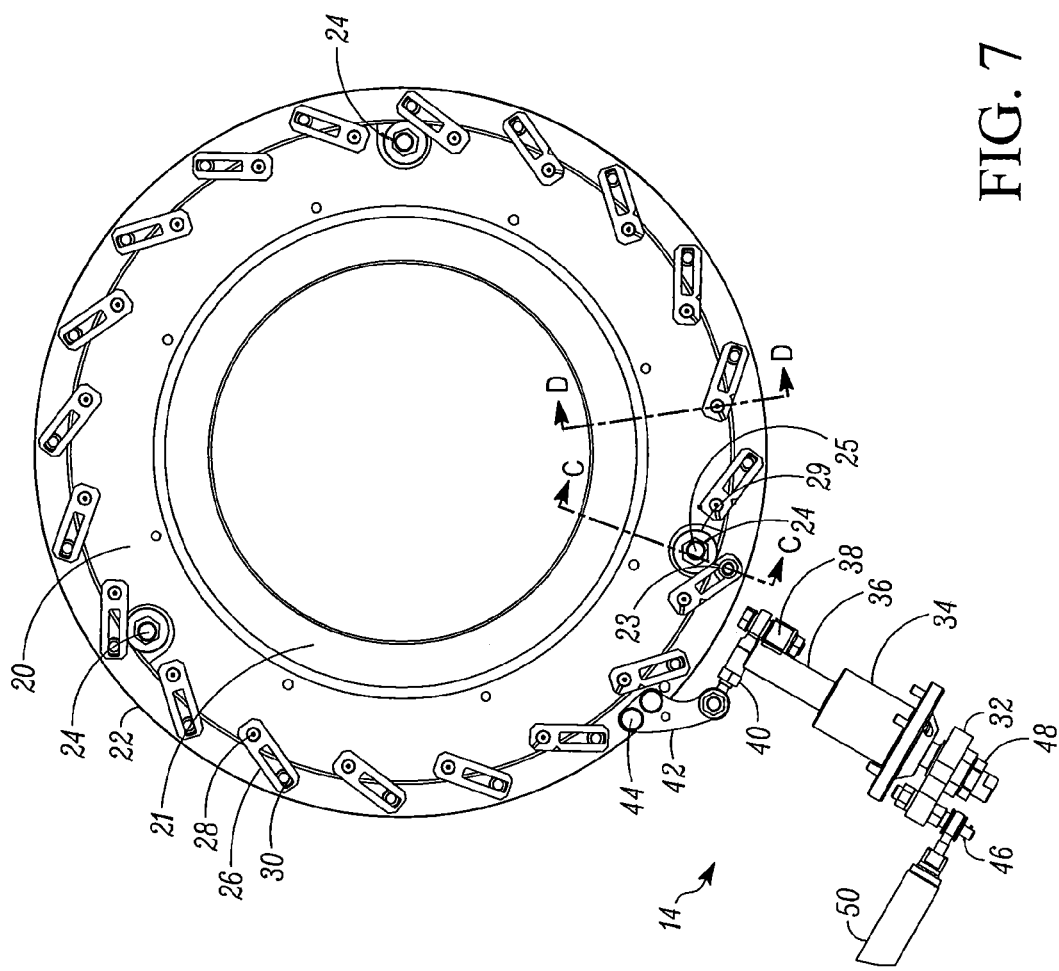
FIG. 7 is a side view of part of the movable inter-stage vane assembly from the side opposite the vane side and of part of the actuation linkage assembly.
Figure 8A:
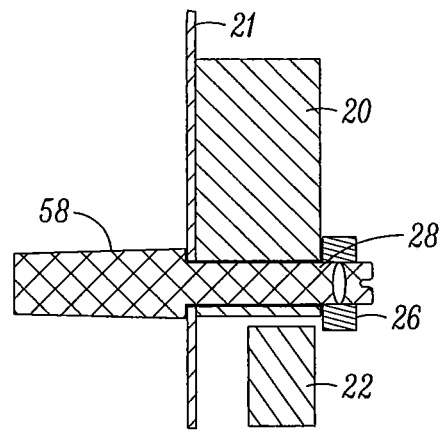
FIG. 8A is a sectional view taken from D-D shown in FIG. 7.
Figure 8B:
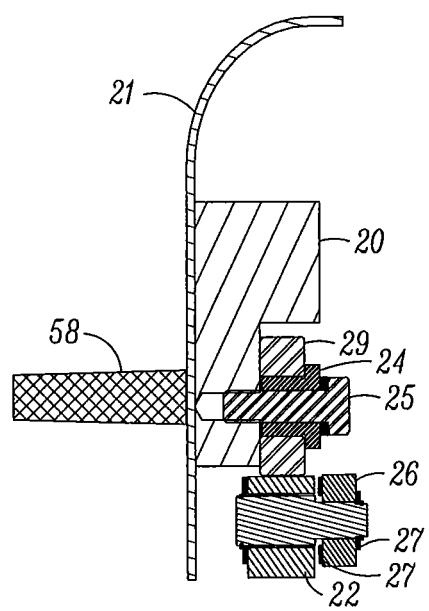
FIG. 8B is a sectional view taken from C-C shown in FIG. 7.
Figure 9:
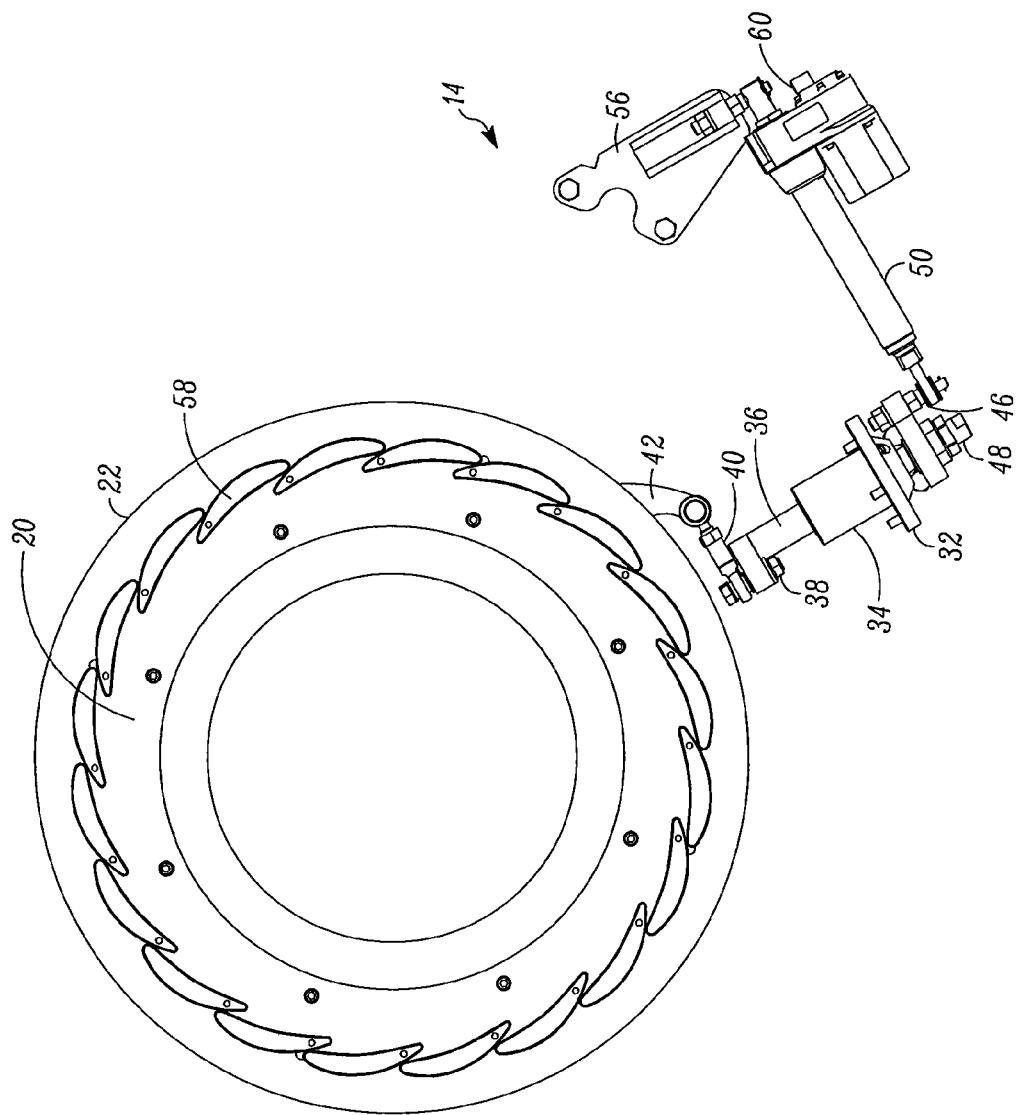
FIG. 9 is a side view of part of the movable inter-stage vane assembly shown from the vane side and of part of the actuation linkage assembly.
Figure 10:
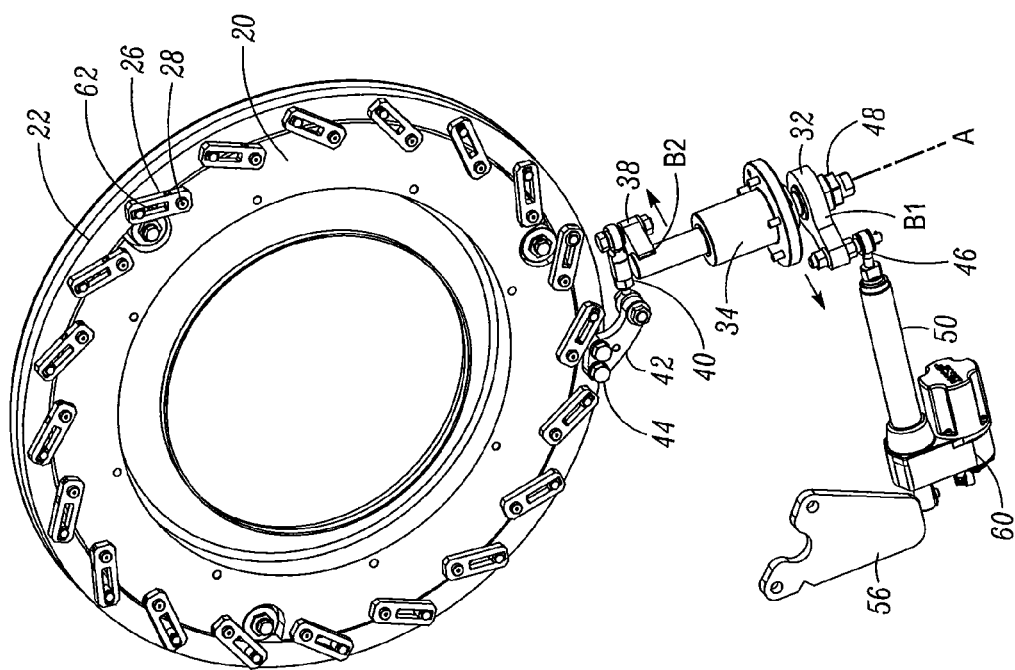
FIG. 10 is a perspective side view of part of the movable inter-stage vane assembly shown from the side opposite the vane side and of the actuation linkage assembly.
Figure 11:
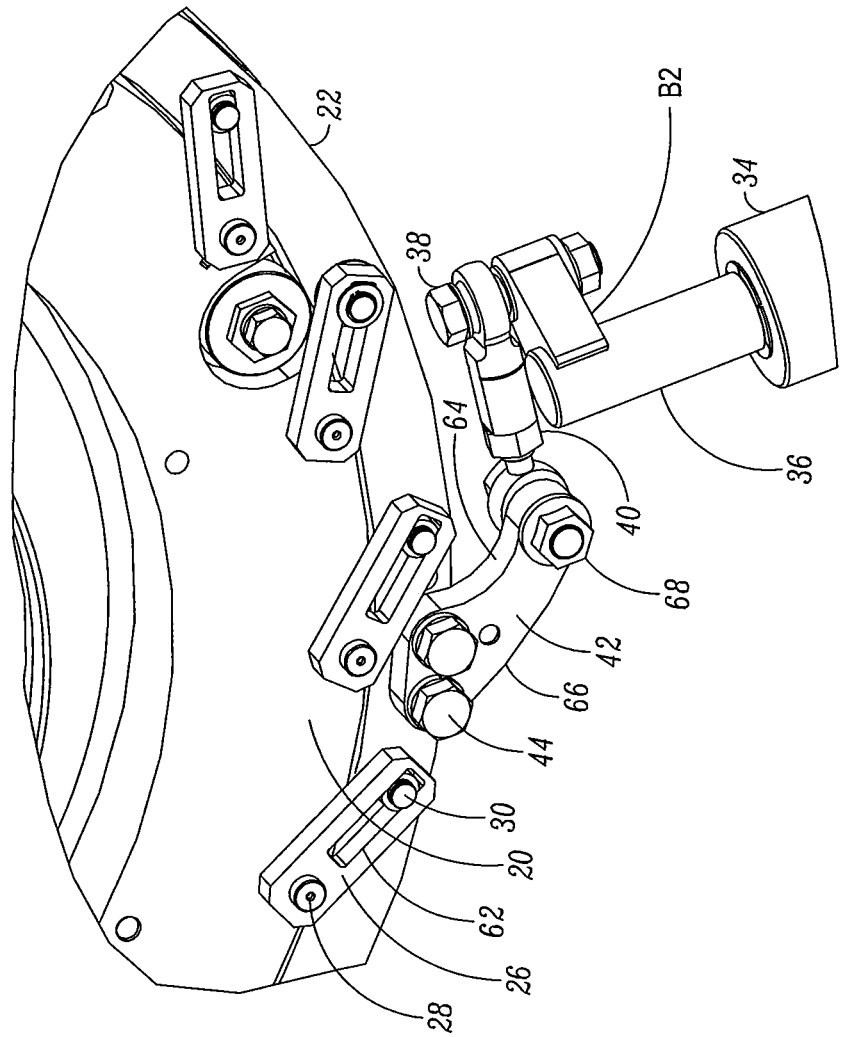
FIG. 11 is a close up view of the actuation linkage assembly shown from the side opposite the vane side.

FIGS. 6 to 11 show features of the movable inter-stage vane assembly 12 and the actuation linkage assembly 14, which are described in further detail below, and where FIGS. 6, 8, and 11 for example show certain close up views of the movable inter-stage vane assembly 12 and the actuation linkage assembly 14 for ease of illustration and description. In particular, FIG. 6 is a close-up view taken from Detail E of FIG. 5. FIG. 7 is a side view of part of the movable inter-stage vane assembly 12 from the side opposite the vane side and shows part of the actuation linkage assembly 14. FIG. 8A is a sectional view taken from D-D shown in FIG. 7, and FIG. 8B is a sectional view taken from C-C shown in FIG. 7. FIG. 9 is a side view of part of the movable inter-stage vane assembly 12 shown from the vane side and shows part of the actuation linkage assembly 14. FIG. 10 is a side view of part of the movable inter-stage vane assembly 12 shown from the side opposite the vane side and shows the actuation linkage assembly 14. FIG. 11 is a close up of the actuation linkage assembly 14 shown from the side opposite the vane side.

As shown in FIGS. 7 and 9-11, the movable inter-stage vane assembly 12 includes an inner support ring 20 around which an outer driver ring 22 is supported, such as for example through one or more cam rollers 24 (see e.g. FIG. 7). The inner support ring 20 in an embodiment is a stiffener for a shroud 21 (see e.g. FIGS. 8A and 8B). In an embodiment, the cam rollers 24 are assembled with a guide wheel 29 and screw/washer 25 (see also e.g. FIG. 8B). The movable inter-stage vane assembly 12 supports the guide vanes 58, such as inlet guide vanes, on the inner support ring 20, and are located on the guide vane side (see e.g. FIGS. 8A, 8B, and 9). The driver ring 22 is rotatably connected to the inner support ring 20, such as through pins 28, 30 and a slotted bracket 26. In some embodiments, the pins 28 include the screw/washer 25 connected to the inner support ring 20 on the side opposite the guide vane side (see e.g. FIGS. 5 and 8A-B) and can extend through the inner support ring 20 to connect to the guide vanes 58. The pins 30 are slidably engaged within the slot 62 of the slotted bracket 26 or opening thereof (see e.g. FIG. 11). The pins 30 are connected to the driver ring 22 and when sliding within the slot 62 of the slotted bracket 26, rotate the driver ring 22 relative to the inner support ring 20, which in turn rotates the slotted bracket 62, rotating the pins 28 and thereby the guide vanes 58 to various open states or a closed state (see e.g. FIGS. 10 and 11). In an embodiment, the pins 30 are assembled with a snap ring 23 when assembled with the slotted bracket 26. In an embodiment, it will be appreciated that washers 27 may be employed when assembling the pins 30 and snap rings 23 with the slotted bracket 26 (see e.g. FIG. 8B). It will also be appreciated that the driver ring 22 and the pin 30 may be assembled as a bearing, and that the support ring 20 and pins 28 may be assembled as a bearing.

In one embodiment, the actuation linkage assembly 14 generally includes a first lever arm 32 having a first end connected to a shaft 36 at a first end thereof. The first lever arm 32 has a second end configured to receive a linear actuating motion so as to rotate the first lever arm 32, thereby rotating the shaft 36. The shaft 36 has a second end opposite the first end, where the second end of the shaft 36 is connected to a second lever arm 38 at a first end thereof. The first end of the second lever arm 38 is configured to receive the rotating motion of the shaft 36 so as to rotate the second lever arm 38. The second lever arm 38 has a second end connected to a transition linkage 40 at a first end thereof. The first end of the transition linkage 40 is configured to receive the rotating motion of the second lever arm 38 and has a second end configured to transmit a linear motion therethrough. The second end of the transition linkage 40 is connected to a bracket 42 configured to receive the linear motion of the second end of the transition linkage 40.

The actuation linkage assembly 14 can be connected to the movable inter-stage vane assembly 12, which in some circumstances resides in a compressor, so that parts of the actuation linkage assembly 14 are sealed inside the compressor (e.g. in the movable inter-stage vane assembly 12, and so that some parts of the actuation linkage assembly 14 are external to the compressor (e.g. outside the movable inter-stage vane assembly 12). In FIG. 6, for example parts of the actuation linkage assembly 14 are shown sealed inside the movable inter-stage vane assembly 12. As shown, one or more seals such as for example seals 52, 54, which may be any suitable seal such as for example o-ring seals, gasket seals, and the like. The seals seal for example part of a housing 34 and the shaft 36 inside the movable inter-stage vane assembly 12, and part of the housing 34 and part of the shaft 36 outside the movable inter-stage vane assembly 12. The first lever arm 32 and its connection structure 48 to the shaft 36 are shown external of the movable inter-stage vane assembly 12.

Further, in FIG. 11, the close up view shows that the actuation linkage assembly 14 can be connected to the movable inter-stage vane assembly 12 by way of the bracket 42. The bracket 42 can be bolted 44 to the driver ring 22. The components and mechanism of the actuation linkage assembly 14 are further described below.

In some embodiments, the first lever arm 32 is adjustable relative to the shaft 36 and the second lever arm 38 is fixed relative to the shaft 36. In some embodiments, the first lever arm 32 and the second lever arm 38 are oriented (e.g. circumferentially at position B1 and B2 respectively, relative to the shaft 36) about the axis A of the shaft 36, such that when an amount of rotation of the first lever arm 32 rotates the shaft 36, the amount of rotation of the second lever arm 38 is equivalent or about the same as the amount of rotation of the first lever arm 32 (see e.g. FIG. 10).

That is, the first lever arm 32 and the second lever arm 38 in some embodiments can be in the same orientation, such that as one example, when the first lever arm 32 rotates, the second lever arm 38 rotates at the same or about the same amount of rotation as the first lever arm 32. In some embodiments, the first lever arm 32 can have an adjustable type connection structure 48, for example a clamping type connection such as a collet type connection, which can allow positioning of the first lever arm 32, so that the starting position of the vanes 58 can be known, e.g. fully closed position, fully collapsed position.

In some embodiments, the actuation linkage assembly 14 is connected to an actuator 60. In some embodiments, the actuator 60 is a linear actuator. In some embodiments, the actuator 60 includes a motor and may be an electrically pulsed component which can be stepped in or out and connected to movable rod 50. As shown the movable rod 50 is a telescoping structure, having a rod within a cylinder. In some embodiments, the amount of movement of the movable rod 50 may depend for example on an actuation schedule that can be employed to operate the guide vanes (e.g. actuation, de-actuation).

As shown, the actuator 60 is connected to the first lever arm 32 through a connection structure 46, which may be in some examples a tie rod end on the movable rod 40 and bolt through an opening of the first lever arm 32 and the tie rod end. In some examples, the first lever arm 32 is connected to the shaft 36, which extends into the housing 34. In some embodiments, the first lever arm 32 has the connection structure 48, which in some embodiments may be configured as a clamping type connection, such as for example a "collet type" connection to grip the first lever arm 32 and position it on the shaft 36, such as a circumferential position on the shaft 36. As shown, the actuator 60 and first lever arm 32 in some embodiments for example are external to a compressor (not shown), e.g. the movable inter-stage vane assembly 12. In some embodiments, the housing 34 connects to the inter-stage casing, such as for example by way of bolts, which also makes a seal (e.g. seals 52, 54) from atmosphere and the inside of the compressor, e.g. using lip, gasket, and/or o-ring seals and the like (see e.g. FIGS. 2-6). The actuator 60 in some embodiments can include a mounting member 56, such as for example a plate or bracket which connects the actuator 60 externally to the compressor, e.g. on the movable inter-stage vane assembly 12.

In some embodiments, the second lever arm 38 is shorter than the first lever arm 32. In some embodiments, the second lever arm 38 extends outward from the shaft 36 at a distance that is shorter than a distance that the first lever arm 32 extends outward from the shaft 32 (see e.g. arrows in FIG. 10). In some embodiments, the second lever arm 38 is connected to the shaft 36 which extends through the housing 34 but may be detachable. In some embodiments, the second lever arm 38 may be welded to the shaft 36.

Figure 12:
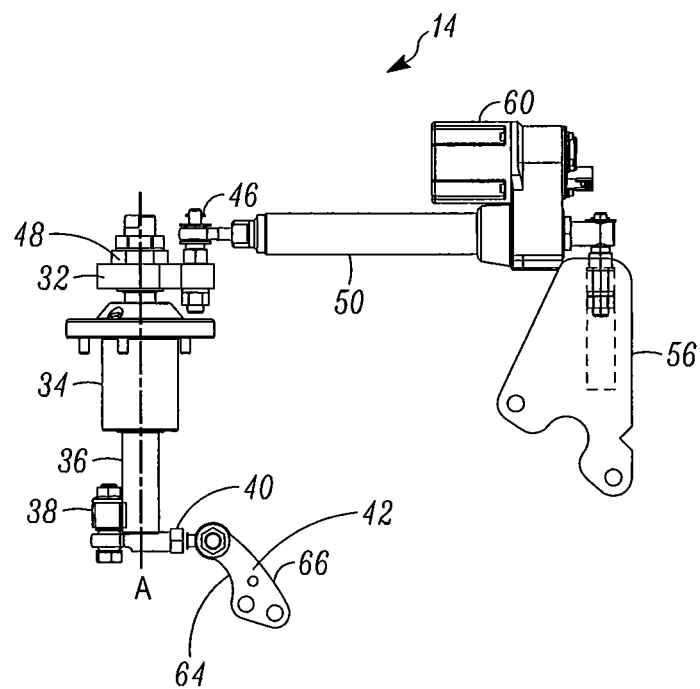
FIG. 12 is a side view of actuation linkage assembly.
Figure 13:
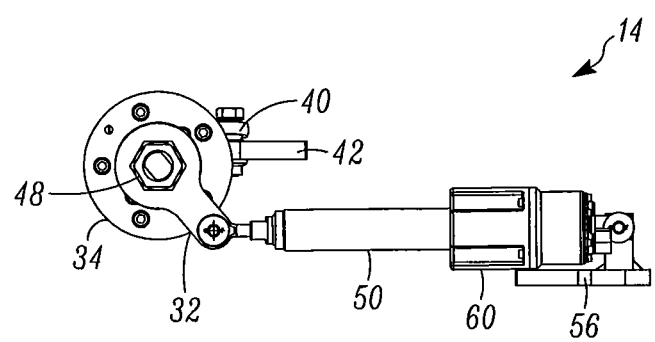
FIG. 13 is a bottom view of the actuation linkage assembly shown in FIG. 12.
Figure 14:
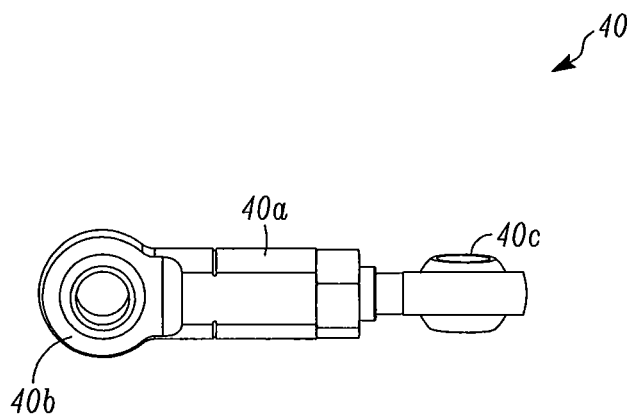
FIG. 14 is a side view of a transition linkage of the actuation linkage assembly shown in FIG. 12.
Figure 15:
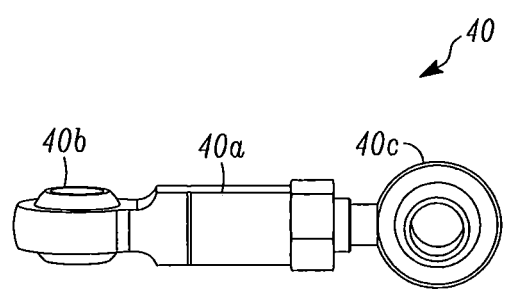
FIG. 15 is another side view of the transition linkage shown in FIG. 14.

FIGS. 12 to 15 show additional close up views of the actuation linkage assembly 14 and its components, including the transition linkage 40, while also making reference back to the close up view of FIG. 11. In particular, FIG. 12 is a side view of actuation linkage assembly 14. FIG. 13 is a bottom view of the actuation linkage assembly 14 shown in FIG. 12. FIGS. 14 and 15 are different side views of the transition linkage 40.

In some embodiments, the transition linkage 40 includes a connector 40b at the first end and a connector 40c at the second end with a main body 40a therebetween. In some embodiments, the connector 40b at the first end receives a rotational motion to move the main body 40a in a linear motion, and where the connector 40c at the second end receives the linear motion (see e.g. FIGS. 14 and 15)

In some embodiments, the transition linkage 40 includes the main body 40a being a rod, and the connectors 40b, 40c are ties. In some embodiments, the transition linkage is a tie rod structure having a rotational tie as the connector 40b at the first end and a linear tie as the connector 40c at the second end.

In some embodiments, the transition linkage 40 may be referred to as a spherical rod end bearing (e.g. "dog bone looking configuration) that is configured to go from an axial rotational movement, e.g. at the connector 40b, which is received by the relatively small second lever arm 38 on the shaft 36 to linearly drive the bracket 42 for example at connection structure 68, which can rotate the driver ring 22, which rotates another small lever (e.g. slotted bracket 26) on the inner support ring 20 to drive, e.g. rotate the guide vanes 58 (see e.g. FIGS. 11 to 13 and FIGS. 9 and 10).

In some embodiments, the bracket 40 has a concave curvature 64 on one or more sides (see e.g. FIGS. 11 and 12).

The concave curvature 64 can provide a clearance relative to one or more movable guide vane assembly components. In the embodiment shown, the concave curvature can provide a clearance for the rotating slotted bracket 26 as it moves outward relative to the driver ring 22.

In some embodiments, the bracket 42 has a convex 66 or outward curvature which can facilitate the linear movement of the bracket 42 as received by the transition linkage 40.

It will be appreciated that the bracket 42 can have suitably designed curved portion(s), which can be sculpted, machined, molded, or the like to have a configuration so as to not interfere with other moving components, such as the slotted bracket 26 of the vanes 58, and to have a configuration that can facilitate the movement of the bracket 42 when receiving the motion of the transition linkage 40. It will be appreciated that the bracket 42 can provides a suitable geometry for clearance and for facilitating movement.

In some embodiments, the connection structure 68 of the bracket 42 and the transition linkage 40 can be a rotatable connection, such that there can be allowed free rotation with respect to the connection structure 68. When the second lever arm 38 moves the transition linkage 40, the transition linkage 40 may rotate freely relative to the connection structure 68 with the bracket 42, and where the bracket 42 can also move the driver ring 22, which in the embodiment shown would rotate clockwise (e.g. to the left) for example around an inner support ring 20 around the one or more cam rollers 24. For example the inner diameter of the driver ring 20 rotates via the cam rollers 24 around the inner support ring 20, which helps hold the driver ring 22 in its rotatable position, e.g. centered position.

As described, in some embodiments, the inner support ring 20 has the vanes 58 connected thereto using the pins 28, which may be connected or otherwise fixed to a slotted bracket 26. As the driver ring 22 rotates, the pins 30 on the driver ring 22 can slide in the slots 62 of slotted bracket 26 closer to the pins 28 of the slotted bracket 26, which transmit movement, such as a rotation of the slotted bracket 26 and pin 28, which transmits rotation to the blades or vanes 58. In some embodiments the vanes 58 are connected to the pins 28, which may be fixed to the bracket 26. The pin in some embodiments is the axis of the vanes 58.

In some embodiments, the actuation linkage assembly 14 is implemented as a part of a compressor (e.g. compressor 100 in FIG. 1). In some embodiments, the actuation linkage assembly 14 is implemented as a part of a centrifugal compressor. In some embodiments, the centrifugal compressor is a part of a chiller unit (e.g. chiller unit 10 in FIG. 1). In some embodiments, the chiller unit is part of a HVAC system or refrigeration system.

In one embodiment a method for actuating guide vanes includes receiving a rotating axial motion by a transition linkage (e.g. 40), transmitting a linear motion through the transition linkage, receiving the linear motion by a bracket (e.g. 42), transmitting the linear motion through the bracket, rotating a driver ring (e.g. 22) connected to the bracket, and rotating one or more guide vanes to one or more open states or to one or more relatively closed states.

In an embodiment, the transition linkage (e.g. 40) provides a mechanical link which can address two components that have rotation planes that are 90 degrees out of plane, for example, the rotation of the shaft 36 by the actuator 60 in one plane and the driver ring 22 rotating in another plane. In an embodiment, the transition linkage (e.g. 40) operates in three dimension, where it moves in three dimensions to accommodate the two rotation planes, thereby providing suitable degree of freedom for the one transition linkage. In an embodiment, the transition linkage (e.g. 40) is a link in a four-bar linkage. For example, the transition linkage is an implementation of a four bar linkage into an application used in a centrifugal compressor guide vane assembly. The transition linkage provides good mechanical advantage and reliability.

For example, the connectors (e.g. 40b, 40c) provided suitable and improved surface contact between connections in the assembly. In an embodiment, the connectors, e.g. 40b, 40c, surrounds the component for example the second lever arm 38 and the connector 48 of the bracket 42. In an embodiment, the connection of the connector with the components is in a clearance fit. In an embodiment, the connectors, e.g. 40b, 40c, are in a bearing like configuration providing significant bearing area. In an embodiment, the surface contact of the connectors with the components may not completely surround the components. Generally, the connector configuration can provide reliability and reducing stress on wear points, where the surface contacts are configured and arranged thereby reducing contact stress and reducing surface pressure, which may be susceptible in assemblies with linear or point contact in the linkage. The connectors of the transition linkage herein provide suitable and improved surface contact over relatively smaller point contacts as in previous fork and rod or rack and pinion approaches.

The actuation linkage assembly herein can provide a high strength drive mechanism that may be used in relatively high tonnage, capacity chiller units that may employ relatively higher pressure, denser refrigerants, which can impart greater loads on movable components such as the inlet guide vanes of a compressor, e.g. centrifugal compressor.

The shaft in combination with the transition linkage and bracket can advantageously translate axial rotation back to linear motion. The transition linkage for example can convert axial rotational motion to linear motion.

In some embodiments, the actuation linkage assembly provides a four bar linkage design which may include the first lever arm connected to one end of a shaft, a second lever arm connected at one end to the other end of the shaft, a transition linkage connected to the other end of the second lever arm, and a bracket connected to the transition linkage. The transition linkage is configured to connect the bracket on the driver ring and the shaft entering the compressor to transfer radial motion of the shaft from linear motion from an actuator to radial motion of the driver ring. The actuation linkage assembly can have a configuration that is simple, has high mechanical advantage, and may utilize commercially available linkage parts.

Figure 16:
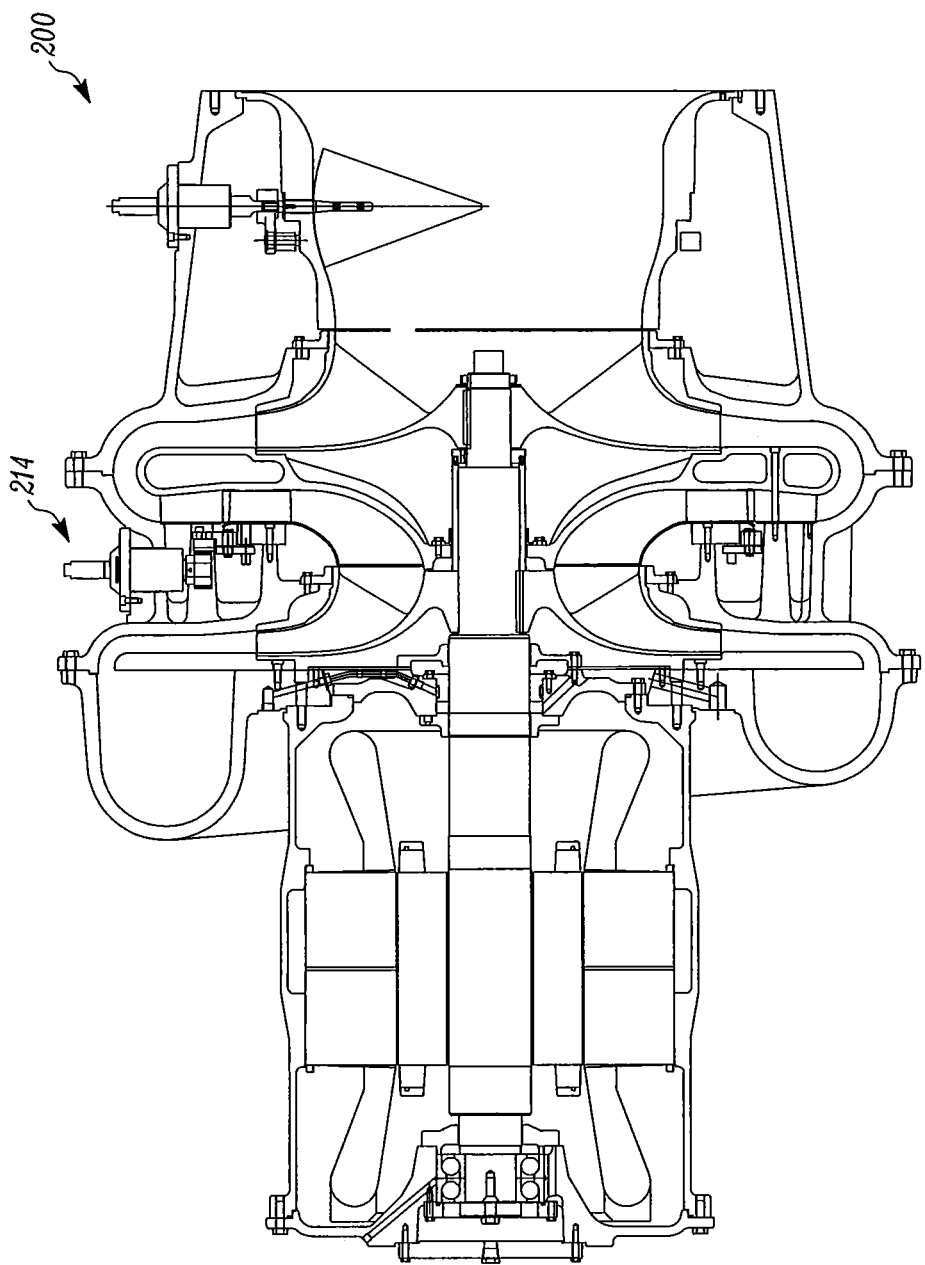
FIG. 16 is a movable inter-stage vane assembly using an earlier rack and pinion design for an actuation assembly.
Figure 17:
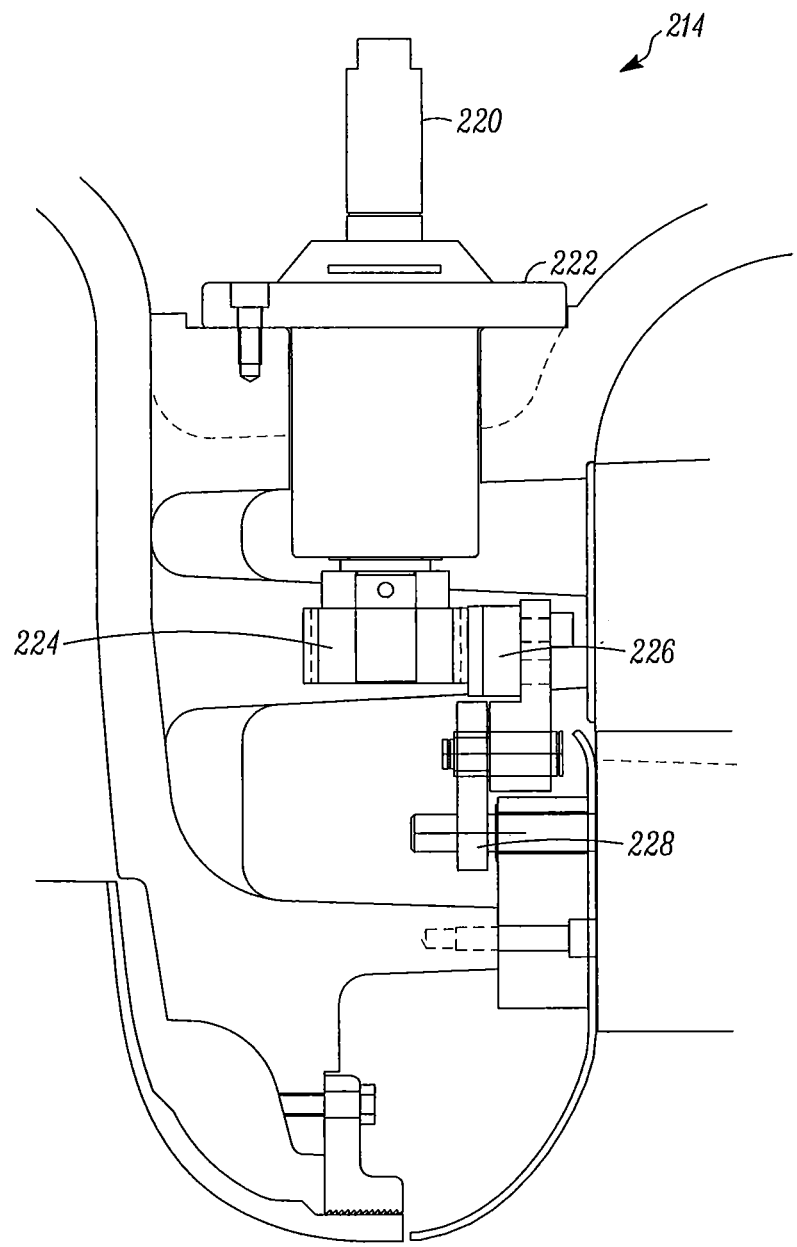
FIG. 17 is a close up view of the rack and pinion design.

FIGS. 16-19 show earlier approaches of actuation linkages. FIG. 16 is a movable inter-stage vane assembly of a compressor 200 using an earlier rack and pinion 214 design for an actuation assembly. FIG. 17 is a close up view of the rack and pinion design shown in FIG. 16. In the rack and pinion 214 design, a shaft 220 connects with a housing 222, which connects to a pinion gear 224 and a rack gear 226 to drive the driver ring 228. The gears 224, 226 are assembled to have proper alignment, and also have wear points while not having the surface contact that a transition linkage herein provides.

Figure 18:
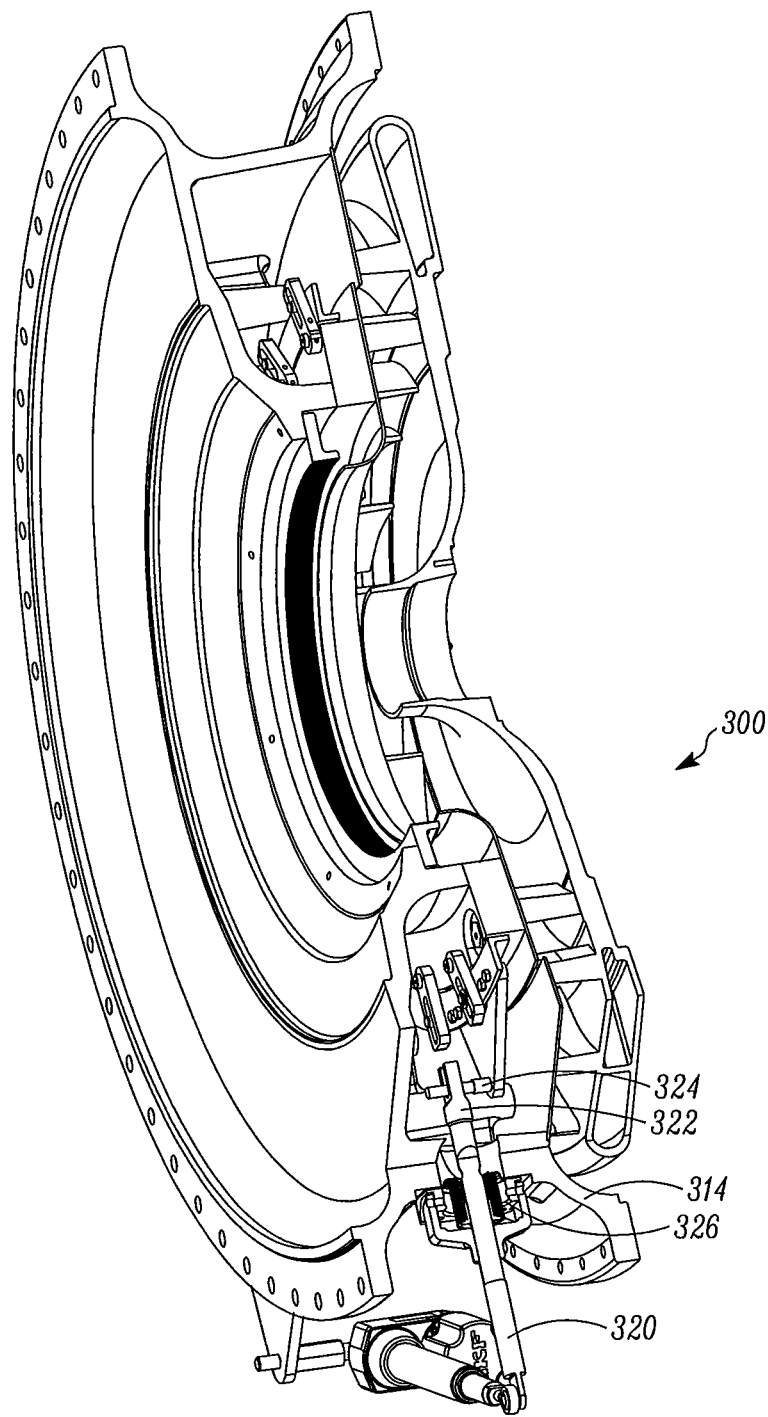
FIG. 18 is a perspective partial section view of a portion of a movable inter-stage vane assembly using an earlier fork and rod design for an actuation assembly.
Figure 19:
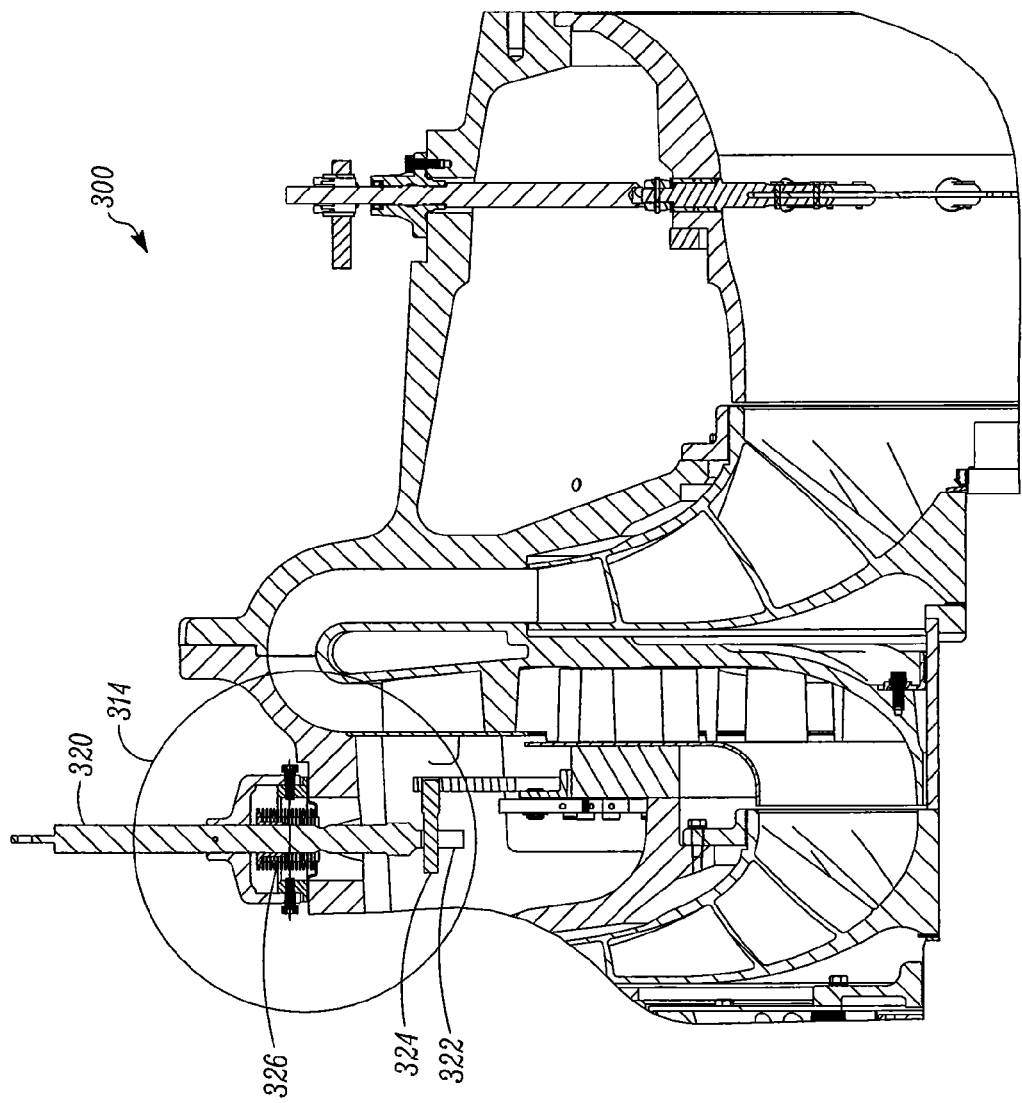
FIG. 19 is a sectional close up view of the fork and rod design.

FIG. 18 is a perspective partial section view of a portion of a movable inter-stage vane assembly of a compressor 300 using an earlier fork and rod 314 design for an actuation assembly. FIG. 19 is a sectional close up view of the fork and rod 314 design. In the fork and rod 314 design, a shaft 320 has a fork 322 and is implemented with a bellows assembly 326. The fork 322 engages a rod 324, which drives a plate and driver ring of the vane assembly. The fork and rod method can flex and/or deflect due to side forces and due to creation of a higher moment on the driver ring, while taking up more space.

Aspects

Aspects—

Any of aspects 1 to 18 below may be combined with aspect 19 and any other aspects below.

Aspect 1. An actuation linkage assembly comprises a first lever arm having a first end connected to a shaft at a first end thereof. The first lever arm has a second end configured to receive a linear actuating motion so as to rotate the first lever arm, thereby rotating the shaft. The shaft has a second end opposite the first end, where the second end of the shaft is connected to a second lever arm at a first end thereof. The first end of the second lever arm is configured to receive the rotating motion of the shaft so as to rotate the second lever arm. The second lever arm has a second end connected to a transition linkage at a first end thereof. The first end of the transition linkage is configured to receive the rotating motion of the second lever arm and has a second end configured to transmit a linear motion therethrough. The second end of the transition linkage is connected to a bracket configured to receive the linear motion of the second end of the transition linkage.

Aspect 2. The actuation linkage assembly of aspect 1, wherein the first lever arm is adjustable relative to the shaft and the second lever arm is fixed relative to the shaft.

Aspect 3. The actuation linkage assembly of aspect 1 or 2, wherein the first lever arm and the second lever arm are oriented about the axis of the shaft such that when an amount of rotation of the first lever arm rotates the shaft, the amount of rotation of the second lever arm is equivalent or about the same as the amount of rotation of the first lever arm.

Aspect 4. The actuation linkage assembly of any of aspects 1 to 2, wherein the actuation linkage assembly is connected to an actuator.

Aspect 5. The actuation linkage assembly of aspect 4, wherein the actuator is a linear actuator.

Aspect 6. The actuation linkage assembly of any of aspects 1 to 5, wherein the second lever arm is shorter than the first lever arm.

Aspect 7. The actuation linkage assembly of any of aspects 1 to 6, wherein the second lever arm extends outward from the shaft at a distance that is shorter than a distance that the first lever arm extends outward from the shaft.

Aspect 8. The actuation linkage assembly of any of aspects 1 to 7, wherein the transition linkage includes a connector at the first end and a connector at the second end with a main body therebetween, where the connector at the first end receives a rotational motion to move the main body in a linear motion, and where the connector at the second end receives the linear motion.

Aspect 9. The actuation linkage assembly of any of aspects 1 to 8, wherein the transition linkage includes the main body being a rod, and the connectors are ties.

Aspect 10. The actuation linkage assembly of any of aspects 1 to 9, wherein the transition linkage is a tie rod structure having a rotational tie as the connector at the first end and a linear tie as the connector at the second end.

Aspect 11. The actuation linkage assembly of any of aspects 1 to 10, wherein the transition linkage is a spherical rod end bearing that is configured to receive an axial rotational movement through the second lever on the shaft to linearly drive the bracket, which can rotate a driver ring which rotates a small lever on the driver ring to drive the guide vanes.

Aspect 12. The actuation linkage assembly of any of aspects 1 to 11, wherein the bracket has a concave curvature on one or more sides.

Aspect 13. The actuation linkage assembly of aspect 12, wherein the concave curvature provides a clearance relative to one or more movable guide vane assembly components.

Aspect 14. The actuation linkage assembly of any of aspects 1 to 13, wherein the bracket has a convex or outward curvature on one or more sides, of which can facilitate the linear movement of the bracket as received by the transition linkage.

Aspect 15. The actuation linkage assembly of any of aspects 1 to 14 is implemented as a part of a compressor. In some embodiments, the actuation linkage assembly is implemented as a part of a centrifugal compressor.

Aspect 16. The actuation linkage assembly of any of aspects 1 to 15, wherein the compressor is a centrifugal compressor.

Aspect 17. The actuation linkage assembly of any of aspects 1 to 16, wherein the compressor is a part of a chiller unit.

Aspect 18. The actuation linkage assembly of any of aspects 1 to 17, wherein the chiller unit is part of a HVAC system or refrigeration system.

Aspect 19. A method for actuating guide vanes includes receiving a rotating axial motion by a transition linkage, transmitting a linear motion through the transition linkage, receiving the linear motion by a bracket, transmitting the linear motion through the bracket, rotating a driver ring connected to the bracket, and rotating one or more guide vanes to one or more open states or one or more relatively closed states.

The invention claimed is:

1. An actuation linkage assembly, comprising:
   a shaft including a first end and a second end opposite the first end;
   a first lever arm including a first end and a second end, the first end of the first lever arm is connected to the first end of the shaft, the second end of the first lever arm is configured to receive a linear actuating motion so as to rotate the first lever arm, thereby rotating the shaft;
   a second lever arm including a first end and a second end, the first end of the second lever arm is connected to the second end of the shaft, the first end of the second lever arm is configured to receive a rotating motion of the shaft so as to rotate the second lever arm;
   a transition linkage including a first end and a second end, the first end of transition linkage is connected to the second end of the second lever arm, the first end of the transition linkage is configured to receive the rotating motion of the second lever arm, the second end is configured to transmit a linear motion through the transition linkage; and
   a bracket connected to the second end of the transition linkage, and configured to receive the linear motion of the second end of the transition linkage.

2. The actuation linkage assembly of claim 1, wherein the first lever arm is adjustable relative to the shaft and the second lever arm is fixed relative to the shaft.

3. The actuation linkage assembly of claim 1, wherein the shaft includes an axis, the first lever arm and the second lever arm are oriented about the axis of the shaft, such that when an amount of rotation of the first lever arm rotates the shaft, the amount of rotation of the second lever arm is the same as the amount of rotation of the first lever arm.

4. The actuation linkage assembly of claim 1, further comprising an actuator connected to the first lever arm.

5. The actuation linkage assembly of claim 4, wherein the actuator is a linear actuator.

6. The actuation linkage assembly of claim 1, wherein the second lever arm extends outward from the shaft at a distance that is shorter than a distance that the first lever arm extends outward from the shaft.

7. The actuation linkage assembly of claim 1, wherein the transition linkage includes a connector at the first end and a connector at the second end with a main body therebetween, the connector at the first end receives the rotating motion of the second lever arm to move the main body in a linear motion, and the connector at the second end receives the linear motion transmitted through the main body.

8. The actuation linkage assembly of claim 7, wherein the transition linkage includes the main body being a rod, and the connectors are ties.

9. The actuation linkage assembly of claim 1, wherein the transition linkage is a tie rod structure having a rotational tie as the connector at the first end and a linear tie as the connector at the second end.

10. The actuation linkage assembly of claim 1, wherein the transition linkage is a spherical rod end bearing that is configured to receive an axial rotational movement through the second lever arm from the shaft to linearly drive the bracket, which rotates a driver ring which rotates a small lever on the driver ring to drive guide vanes.

11. The actuation linkage assembly of claim 1, wherein the bracket has a concave curvature on one or more sides.

12. The actuation linkage assembly of claim 11, wherein the concave curvature provides a clearance relative to one or more movable guide vane assembly components.

13. The actuation linkage assembly of claim 1, wherein the bracket has a convex or outward curvature on one or more sides, of which facilitates linear motion of the bracket as received by the transition linkage.

14. A compressor comprising the actuation linkage assembly of claim 1.

15. The compressor of claim 14, wherein the compressor is a centrifugal compressor, and the actuation linkage assembly is implemented as a part of an inlet guide vane assembly of the centrifugal compressor.

16. The compressor of claim 14, wherein the compressor is a part of a chiller unit.

17. The compressor of claim 16, wherein the chiller unit is part of a HVAC system or refrigeration system.

18. A method for actuating guide vanes includes receiving a rotating axial motion by a transition linkage, comprising:
   receiving a rotational motion by a transition linkage,
   transmitting a linear motion through the transition linkage;
   receiving the linear motion by a bracket;
   transmitting the linear motion through the bracket;
   rotating a driver ring connected to the bracket, and
   rotating one or more guide vanes to one or more open states or one or more relatively closed states.

* * * * *